Patented Apr. 29, 1941

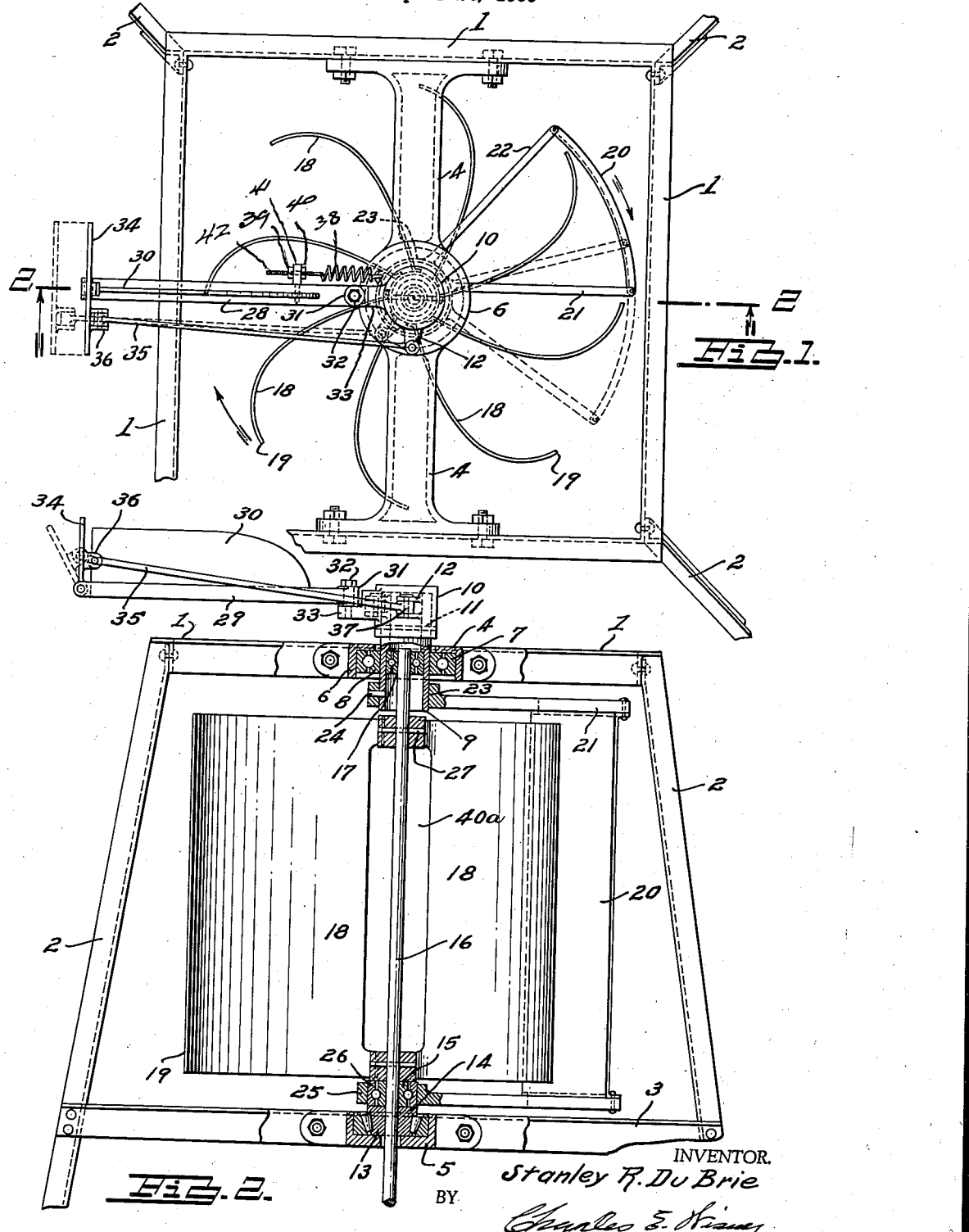

2,240,290

UNITED STATES PATENT OFFICE 2,240,290

WIND MOTOR

Stanley R. Du Brie, Detroit, Mich.

Application April 24, 1939, Serial No. 269,593

1 Claim. (Cl. 170—15)

This invention relates to wind motors, the object being to provide a new and improved wind motor having radially disposed concavo-convex blades attached to a vertical shaft and the air stream entering the concave side of the blades to cause rotation, means being provided to control the number of blades that the air stream may enter.

It is further an object and feature of the invention to provide a wind motor having the radially arranged concavo-convex blades and a wind shield that may be moved to prevent the air stream from entering the concave side of some of the blades.

It is also an object and feature of the invention to provide a means actuated by wind pressure to turn the shield which may be variably positioned under varying wind pressure to shield more or less of the blades and thereby secure a substantially constant speed of rotation of the blades and therefor of the shaft connected with mechanism to be operated.

These and other objects and features of the invention are hereinafter more fully described and claimed and the preferred form of construction of a wind motor embodying my invention is shown in the accompanying drawing in which—

Fig. 1 is a plan view of a wind motor and position of a supporting frame therefor.

Fig. 2 is a vertical section taken on line 2—2 of Fig. 1.

My improved wind motor comprises a framework preferably formed of angle iron the upper end of which comprises a rectangular frame 1 supported at each of the corners by inclined leg portions 2, 2. Spaced a distance below the upper rectangular framework 1 is a second rectangular frame 3 supported by the legs 2, 2. There is an upper cross member 4 having end portions bolted to opposite side members of the upper rectanguar frame and there is also a second cross member 5 extending between two opposite side members of the rectangular framework 3.

The upper cross bar 4 has an enlarged central portion 6, as shown in section in Fig. 2, to receive an anti-friction bearing 7 the outer race of which is secured to the side walls of the central circular portion 6 of the cross bar 4 and the inner race 8 is attached to a tubular member 9. This member 9 extends above the frame 1 to the upper end of which is attached a cap member 10 as by a pin 11. The member 10 has an arm 12 on one side thereof for a purpose hereinafter described.

The lower cross bar 5 has its center vertically aligned with the center of the cup member 6 of the cross bar 4. In the member 5 is provided a cone thrust bearing 13 the inner race 14 of which extends a short distance above the rectangular frame 3 and on this portion 14 is a ball bearing 15 the inner race thereof being attached to the vertical shaft 16. The upper end of the shaft 16 has attached thereto the inner race 17 of a ball bearing, the outer race being secured to the tube 9. Thus the shaft is rotatably supported by the bearing having the inner race 15 and the bearing having the inner race 17 attached to the shaft.

The blades are radially disposed and of concavo-convex form as shown in Fig. 1 so that wind blowing in any particular direction will enter the concave faces of the blades on one side but will be deflected from the opposite or convex side of the blades and rotation will be in the direction of the arrow and will cause rotation of the shaft 16 to operate any mechanism adaptable for connection therewith as, for instance, a water pump for which there is considerable need especially in the cattle ranches of the western United States. It is to be understood, however, that the invention is not confined to use in conjunction with a water pump as many other machines may be connected for operation by the shaft 16.

Especially in the western United States where the wind velocities are oftentimes excessive it is desirable to prevent too rapid rotation of the vanes and connected mechanism. For this purpose I provide a shield which consists of an arcuate plate 20 of a radius slightly greater than the radius of the terminal ends 19 of the blades 18 and extending but a little more than the whole height of the blade 18 as shown in Fig. 2. The upper end of the shield plate 20 has arms 21 and 22 connected at their outer ends to the shield plate 20 and the inner ends are joined to a hub 23 which is apertured to receive the lower end of the tube 9 and is secured thereto as by a pin 24. The lower end of the shield plate 20 has a similar arrangement of arms connected to a hub 25 to which the outer race 26 of the ball bearing member having the inner race 15 is secured. Thus the shield plate may turn about the periphery of the blades 18 which blades 18 are secured at the top and bottom to the shaft 16 by pins 27.

The wind wheel is provided with a horizontal vane 28 which comprises a bar 29 and a vertical blade 30 mounted thereon. The forward end of the bar 29 has an eyed end portion 31 through which extends a bolt 32. The lower end of the bolt is threaded in a boss 33 preferably formed integrally with the cap 10. The vane is thus swingable on the bolt. The outer end of the bar 29 has a vertical blade 34 pivoted thereto at the lower edge and provides a plane surface at a right angle to the blade 30. An arm 35 has one end 36 pivoted to the blade 34 and at the opposite end 37 is pivoted to the arm 12 preferably formed integrally with the cap member 10. The blade 34 is thus pivoted to the bar 29 to swing on a horizontal axis while the vane 28 is pivoted to swing on a vertical axis.

The vane 28 is restrained from turning in one direction on its pivot by the tension of a coiled spring 38 one end of which is attached to the bar 29 and the other end of which is attached to the arm 33 which is fixed to the cap 10 attached in turn to the sleeve 9.

The spring 38 is adjustable in tension by means of the nuts 39 and 40 on opposite sides of the bar 41 attached to the vane and threaded on the threaded extension 42 of the spring 38 which passes through an aperture provided therefor in the bar 41. By this means the shield 20 may be moved in the direction of the arrow at a predetermined wind pressure.

Obviously, the shield 20, being attached to the tube 9 to which the cap 10 is fixed at the upper end, provides a construction in which the vane 30 carrying the vertical vane 34 and the shield may turn as a unit about the axis of the shaft 16 and thus, under any direction of wind, the vane 30 keeps the shield 20 toward the wind. If there were no wind, the tension of the spring 38 would tend to throw the shield in direction opposite that of the arrow and likewise turn the vane 30 toward the shield. The vane 30 therefore merely acts to keep the shield on the side of the device in the direction from which the wind is blowing. With an increased wind pressure, the vertical vane 34 tends to turn the shield in the direction of the arrow without change in rotative position of the vane 30.

Therefore, in operation, assuming the wind is steady as to both direction and force, the parts will simply remain in the position shown in Fig. 1.

However, if the wind increases in pressure, but without change in direction, the shield 20 will be swung to the dotted line position in Fig. 1 by movement of the vane 34 to dotted line position, and this angular relation of the vane 34 and shield 20 will vary depending on the variation in pressure.

In case the wind changes in direction, either clockwise or anti-clockwise, without any change in wind velocity, the vanes 30, 34 and shield 20 simply turn on the axis of the shaft 16, without change in the angular relationship of the shield and horizontal vane 30.

In the event that the wind changes in pressure and simultaneously in direction, either clockwise or anticlockwise, of course the vane 30 and the shield 20 will swing correspondingly in either clockwise or anti-clockwise direction, and the change in pressure will change correspondingly the angular relationship of the shield 20 and vane 30, as such vane 30 always lays in the direction of the wind.

When the wind pressure is sufficiently great this movement of the blade 34 tends to rotate the sleeve 9 and the attached shield 20 in the direction of the arrow adjacent thereto from the position shown in full lines in Fig. 1 to the dotted line position and thus the concave faces of more of the blades 18 of the wind motor will be covered by the shield and less blades will be subjected to pressure of the air stream.

It is to be noted that while the vane 28 is pivoted relative to the cap 10 it does not tend to move as the blades 30 of the vane 28 hold the vane in alignment with the direction of flow of the air stream and therefore it is the shield that is relatively moved by wind pressure on the blade 34 and the degree of pressure increasing or decreasing will correspondingly vary the position of the shield so that with lesser wind pressure more of the blades are open to the air stream on the concave or intake side and with increasing wind pressure a less number of blades 18 are open to the air stream on the intake side.

Preferably the blades 18 for a major portion of their length at the inner edge are spaced from the shaft providing apertures 40a and thus a portion of the air stream entering the concave side of a blade will pass through the aperture and exert pressure on one or several preceding blades in the direction of rotation of the wind motor.

By the described arrangement of parts I secure a more efficient and serviceable wind motor that is less subject to variation in speed of rotation and is therefore a material improvement over prior wind wheels or motors as there is less liability of detrimental effect from excessive speed of rotation of the wheel.

From the foregoing description it will be evident that the described relationship of vane and shield including the pressure responsive device for positioning the shield relative to the blades of the wind wheel is a principal factor in obtaining the various objects and features of the invention hereinbefore described.

Having thus fully described my invention, its utility and mode of operation, what I claim and desire to secure by Letters Patent of the United States is—

A wind motor comprising a framework, a wind wheel having radially extending blades of a concavo-convex type positioned in a vertical plane, a vertical shaft to which the blades are attached, a bearing for the shaft supported by the framework and being of a character to support the weight of the wheel at the lower side, an anti-friction bearing for the upper end of the shaft, a tubular member in which the upper shaft bearing is supported, an anti-friction bearing for the tubular member supported by the framework, a wind shield comprising a curved plate having a radius slightly greater than the radius of the blades and of a width circumferentially greater than the space between two adjacent blade ends, a frame for the shield comprising elements at the upper and lower end thereof, the shield frame element at the upper end of the shield being secured to the tubular member and the shield frame element at the lower end of the shield being rotatably secured to the shaft below the wind wheel, a horizontal vane, a member secured to the upper end of the said tube having a portion at a distance from the axis of the tube to which the vane is pivotally mounted to swing on a vertical axis, a contracting spring extending between the vane and the member secured to the tube tending to turn the tube and consequently the shield, the pivotal point of the vane being on the side of the axis of the shaft opposite that occupied by the shield and said spring tending to hold the shield in position to cover the convex side of some of the blades, and means responsive to wind pressure in excess of the spring tension to turn the said tube and shield in a direction to cut off air flow to the concave faces of some of the blades.

STANLEY R. DU BRIE.